US006292894B1

(12) United States Patent
Chipman et al.

(10) Patent No.: US 6,292,894 B1
(45) Date of Patent: Sep. 18, 2001

(54) SYSTEM, METHOD, AND MEDIUM FOR RETRIEVING, ORGANIZING, AND UTILIZING NETWORKED DATA

(75) Inventors: Richard R. Chipman, Reston; Alan Mankofsky, Falls Church, both of VA (US); Harshavardhan M. Karandikar, Heidelberg (DE); Gary Warren, Fairfax, VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/441,646

(22) Filed: Nov. 23, 1999

Related U.S. Application Data

(63) Continuation of application No. 09/120,182, filed on Jul. 22, 1998, which is a continuation of application No. 08/925,337, filed on Sep. 8, 1997, now abandoned.

(51) Int. Cl.[7] .................................................. G06F 11/30

(52) U.S. Cl. .......................... 713/168; 713/193; 713/201

(58) Field of Search ................................. 713/168, 193, 713/201, 182

(56) References Cited

U.S. PATENT DOCUMENTS

| 5,649,186 | 7/1997 | Ferguson . |
| 5,694,523 | 12/1997 | Wical . |
| 5,694,593 | 12/1997 | Baclawski . |
| 5,710,887 | 1/1998 | Chelliah et al. . |
| 5,737,592 | 4/1998 | Nguyen et al. . |
| 5,832,494 | 11/1998 | Egger et al. . |
| 5,848,410 | 12/1998 | Walls et al. . |
| 5,890,175 | 3/1999 | Wong et al. . |
| 5,895,470 | 4/1999 | Pirolli et al. . |
| 5,913,214 | 6/1999 | Madnick et al. . |
| 5,926,798 | * 7/1999 | Carter ...................................... 705/26 |
| 5,940,807 | 8/1999 | Purcell . |
| 5,946,665 | 8/1999 | Suzuki et al. . |
| 5,953,716 | 9/1999 | Madnick et al. . |
| 5,963,965 | 10/1999 | Vogel . |
| 5,970,475 | * 10/1999 | Barnes et al. ........................... 705/27 |

(List continued on next page.)

OTHER PUBLICATIONS

Sakata et al., "Metadata mediation: representation and protocol", Computer Networks and ISDN System, vol. 29, No. 8–13, pp. 1137–1146, Sep. 1997.

Lagoze, C. "The Warwick Framework: A Container Architecture for Diverse Sets of Metadata", D–LIB Magazine, Aug. 1996.

* cited by examiner

*Primary Examiner*—Thomas R. Peeso
(74) *Attorney, Agent, or Firm*—Banner & Witcoff, Ltd.

(57) ABSTRACT

A networked catalog search, retrieval, and information correlation and matching system is disclosed. The system allows suppliers to publish information in electronic catalogs, structure the information in an object oriented representation distributed across a network of computers, for example, the Internet. The system also enables customers to search and retrieve information on products and suppliers which match dynamically specified customer requirements. Through retrieving compliant HTML pages, a search engine forwards retrieved pages to an object oriented database which sorts received information by the information's internal organization structure. By searching the information as stored in the knowledge base, a user may quickly retrieve the stored information as highly tailored to the user's search strategy. Also, additional tools operate on the stored information so as to, inter alia, organize design trades between selected elements where additional design and selection options are provided to each user. Further, the system supports product creation as formed of constituent parts. These products may then be used as parts to be formed into higher level products.

20 Claims, 6 Drawing Sheets

U.S. PATENT DOCUMENTS

| | | |
|---|---|---|
| 5,970,490 | 10/1999 | Morgenstern . |
| 5,974,412 | 10/1999 | Hazlehurst et al. . |
| 5,978,847 | 11/1999 | Kisor et al. . |
| 5,995,943 | 11/1999 | Bull et al. . |
| 6,009,413 | 12/1999 | Webber et al. . |
| 6,014,639 | 1/2000 | Fohn et al. . |
| 6,016,504 | 1/2000 | Arnold et al. . |
| 6,023,683 | 2/2000 | Johnson et al. . |
| 6,026,429 | 2/2000 | Jones et al. . |
| 6,101,515 | 8/2000 | Wical et al. . |
| 6,112,201 | 8/2000 | Wical . |

\* cited by examiner

SYSTEM, METHOD, AND MEDIUM FOR RETRIEVING, ORGANIZING, AND UTILIZING NETWORKED DATA

This application is a Continuation of Ser. No. 09/120,182 filed Jul. 22, 1998; which is a Continuation of Ser. No. 08/925,337, filed Sep. 8, 1997 now abandoned.

The following description includes some copyrighted material. While Applicants do not object to the copying of this specification for patent related purposes, Applicants reserve all copyrights to themselves and/or the assignee of the present invention.

BACKGROUND OF THE INVENTION

1. Technical Overview

The present invention relates to a networked, information gathering and delivery system. More specifically, the present invention relates to a network based (intranet-based, Internet-based, extranet-based) cataloging system which provides a user with a plurality of methods of gathering and analyzing information relating to a subject of interest.

2. Related Art

Manufacturing and service industries exist to provide products and services to end users while making a profit at the same time. In this day and age, many businesses do not control the entire manufacturing process from collecting raw materials to outputting a high level end product. Rather, most businesses take existing components and incorporate the components into larger products. An example includes engineering design systems in which engineers take existing components and design new products using these components. So as to reduce costs, these businesses generally attempt to maximize profits through finding the most affordable materials and processes which satisfy their needs. Simultaneously, to meet the performance or quality objectives for the end product, business must find materials and processes that satisfy a variety of other criteria. Unfortunately, depending on the industry, finding the lowest cost materials or services which meet specified criteria can become very costly and time consuming.

Currently, the designers selecting the various components for a final design can quickly become overwhelmed by the available data as many lower end suppliers may produce similar products. Sorting the available products and attempting to match potential products into an overall design scheme quickly becomes a formidable task when a single end product may contain tens to hundreds to thousands of individual components with each component having its own set of associated data (for example, operating tolerances, power consumption, size constraints, etc.). Further, the manufacturing process which produces the final design may affect the end product in ways unconsidered by the product development team. Because of the significant burden placed on designers to handle design while another set of engineers generally handle the realization of the design through a manufacturing process, the end product may suffer from poor integration of the design and manufacturing processes. To this end, product support also suffers as the team handling product support generally has minimal information regarding the actual design and manufacturing processes and how these processes affect the end product. At least one cause of the failures of the current design, manufacturing, and product support model is the requirement that all steps are handled by an engineer with minimal to no automated support for accommodating the demands of the current model. In fact, most information has to be manually integrated and considered in the formation of a final product.

Another failure of the current model is the lack of integrated tools available to a designer. Currently, a designer must wade through technical information and sequentially use disparate, unintegrated electronic tools to perform a variety of tasks such as requirements definitions, computer aided design (CAD), structural analysis, costing, manufacturing planning, etc. Accordingly, a need exists to automate and integrate the design function as much as possible.

The problems associated with the current design and manufacturing model exist in other industry sectors as well. For example, the real estate industry uses as its primary search and indexing tool the multiple listing service (MLS). This service allows real estate brokers to list properties as well as search for properties using a simple Boolean search function. However, the real estate agent is then required to peruse through the list of retrieved entries until a match is found to many diverse buyer requirements. Further, there is no ability to link to other sources of other information (for example, financial institutions providing loan information, etc.) which may be relevant to the information contained within the MLS. Moreover, MLS is limited to real estate agents only. Independent sellers and buyers cannot list and retrieve the listings available in MLS.

Unlike the restricted nature of MLS, the Internet provides easy access to a variety of information. Search engines (such as Lycos™, AltaVista™, and other search engines) exist that repeatedly scan the Internet (a.k.a., the World Wide Web or, simply, the Web) for content. Current search engines retrieve and store the textual content of HTML pages of the Web in large indexes. A user may later pass simple Boolean queries to databases created by the search engines and retrieve HTML pages relating to the submitted queries. The problem with such Boolean queries for these large indexes of stored information is that actually getting the desired information is cumbersome. Also, current systems must treat the found content as flat, unstructured data; for there is no way to create or find associations between the elements stored on HTML pages. Further, the appearance of subject-oriented searches fails to satisfy the needs of designers and like individuals interested in a narrow field of industry. To this end, current search systems are not directed to the needs of specific users.

SUMMARY OF THE INVENTION

The present invention relates to a computer-based information organizing, searching, retrieving, and exchanging platform. Through gathering organized information, a consumer accesses the gathered information to create an end product in a shorter period of time. The present invention uses a predefined common language and format (for example, hypertext markup language (HTML) extended to implement an underlying organizational structure) for organizing information placed on the network of computers. When retrieved the organized information is readily sorted and cataloged into a repository of similar cataloged information.

When placing the information in a form readily accessible by other computers (for example, on the Internet), a supplier provides the information in HTML format including tags which characterize the formatted information. These tags may include a "class" identifier with each class having various "attributes" and "methods". The various attributes are contemplated to include "features" (comprising character strings), "parameters" (comprising numerical strings), and "index" tags. Through listing an item as belonging to a class and having various attributes, a supplier may fully identify the item using this structured language. Also, each class may be a nested item of another class. So, each component may be broken down into its elemental parts through classifying each of its parts individually. Notably, through the combination of various parts, products may be compiled. A similar approach can be applied to processes or services and their sub components. At this point, the consumer who compiled the product may place the product on the Web as specified in an HIML page with the appropriate tags so that a later consumer may choose to use the previous consumer's product. To this end, each consumer may also be called an integrator as each consumer may integrate parts into products for later integrators.

Also, some classes may have methods or tags associated with them as well which provide procedures for involving simple or complex algorithms or computations and compute performance or behavior of an item in the class. Because the behavior of an item typically depends on its specific use and environment, these computations require information provided by the integrator and not knowable in advance by the product supplier. Thus, method tags provide access to procedures invoked by the integrator when he evaluates possible uses of the item. Method tags contain pointers to computational algorithms, and to the "signature" of the method. A signature defines what input and output information the algorithm needs and provides, respectively.

A scanning engine scans the computers having accessible pages so as to locate all pages having the predefined organizational structure as including class, attribute, and methods identifiers. Through organizing the retrieved information on the basis of the class, attribute, and methods information, the retrieved information is cataloged for later retrieval. The catalogs are stored and updated as needed. Instead of storing all possible information from each HTML page (as including graphic files, text files, Java scripts, and the like), the catalog, for example, may only store the class, attribute, and method identifier information that allow a user to search for and identify the accessed item. The remainder of the accessible information is left back on the originating site for later retrieval. Through this organizational scheme, high level descriptive information (for example, information that may satisfy an initial search) may be stored in a computer that interfaces between an end user and the information source. In this instance, the more detailed information may be left back at the originating source. Thus, the most detailed information, which is the most likely to change is readily updated at the source of the information, minimizing the information which has to be provided to keep each end user, as well as each interfacing computer, current.

As described above, in one embodiment, the cataloged information is stored in a local computer system interfacing between the end user and the information source. For purposes of simplicity, the local computer system as storing categorized information is hereinafter referred to as a "portal" as the portal acts as a primary interface to the organized information residing on the network of computers. When a portal is located on a user's local site, the user has quick access to the variety of information stored at the site.

To this end, embodiments of the present invention contemplate the sector portal maintaining a list of complying HTML pages at each supplier's site so that each portal need only retrieve a new list of supplier sites for compliant pages, rather than search the Web as a whole for compliant pages.

Also, for simplicity, the network of computers is referred to as the Web or the Internet. However, it is understood that any networked group of computers storing organized information is included within the scope of the invention.

The various users of the present invention may be categorized as information suppliers and information consumers. As will be described in greater detail below, as the information consumers in turn supply information to other upstream information consumers, every information consumer may be considered a supplier to other consumers.

So as to enable each supplier to provide requisite information on its pages, a "sector" portal establishes common terms (class, attribute, and method names) for the suppliers and consumers to use. The sector portal is so named because each industry sector is contemplated to have at least one governing portal from which all other portals in that industry sector derive their common vocabulary, taxonomy, or ontology. Each sector portal has the ability to update its own list of accepted classes, attributes, and methods. So, when a supplier begins to use new classes, methods, and attributes, the sector portals selectively update their ontology to include the new classes, methods, and attributes as according to a predetermined scheme. For example, a predetermined scheme may include updating the ontology only after a new class, attribute, or method is used a predetermined number of times (e.g., ten times). An advantage of not updating the ontology for every possible new class, attribute, or method is that 1) mistakes will be made by suppliers in not using the predefined ontology so that the ontology should not necessarily include the mistakes of suppliers and 2) an ontology expanding too quickly may fail to minimize the number of terms used to describe a single item. To this end, the ontology should not necessarily include multiple listings of the same class or attribute when a single one may be used across suppliers.

Once the catalogs are established at a portal, a consumer may use at least one of three search strategies to retrieve the stored information including Boolean searches, hierarchical searches (for example, where a consumer navigates through a hierarchy of classes), and parametric searches (which may include fuzzy searches).

DETAILED DESCRIPTION

The present invention will now be described in detail with reference to the accompanying drawings. While the present invention is described in the context of a communications network including a specific number of components, the cataloging search and retrieval system and integrated tool suite according to the present invention may be incorporated into networks of many structures and sizes. The drawings are intended to provide one example of a network configuration in which a cataloging search and retrieval system may be implemented and are not intended to limit the applicability of the present invention to other network configurations.

Figure 1:
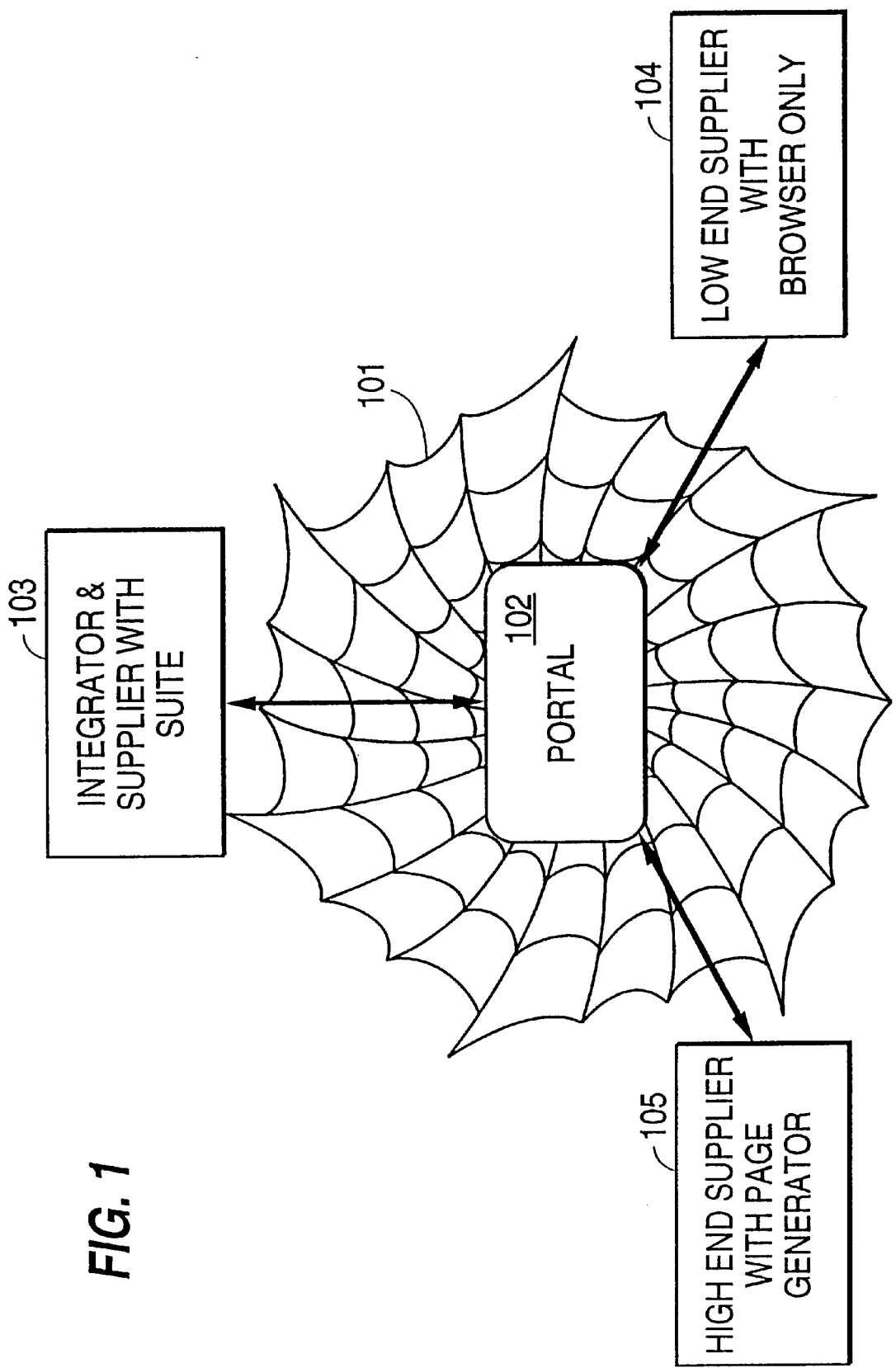
FIG. 1 shows an organization diagram of various suppliers and consumers according to embodiments of the present invention.

FIG. 1 shows a high level functional arrangement of the contributors and users of the organized information. The network of computers, in this example, is shown as the Internet or Web 101. Portal 102, in one aspect of the present invention, functions as an entry way into the stored catalogs of information. As will be described in greater detail below, portal 102 may reside at a number of locations. Also multiple portals may exist for an industry. In the case of a single portal 102 for an industry, the portal 102 is referred to as the sector portal 102. In the case of multiple portals 102 (for example, each company having its own portal 102), then one of the portals 102 may be considered the sector portal. The sector portal may maintain control over the accepted ontology. Portal 102 is contemplated to include at least one processor and at least one storage device. Through the implementation of stored program modules, the portal (or portals) 102 may control the collection and dissemination of information as described in greater detail with respect to FIGS. 2–6.

Also shown in FIG. 1 are suppliers (104 and 105) of information. The suppliers (104 and 105) of information provide information to portal 102 for use by user 103. User 103 uses the information stored in portal 102 to make decisions on the information as well as retrieve greater amounts of information as needed from suppliers 104 and 105. Further, user 103 includes a tool suite which uses the information in portal 102 and at providers 104 and 105 to provide additional functions to the user including, inter alia, the availability of alternative decision trades, the likelihood of success of selected components meeting an overall design criteria, etc. To provide information to portal 102, suppliers 104 and 105 make their information available for retrieval via the Web 101 by placing their pages in HTML format on a server connected to the Web 101. As only some of the entities (business, organizations, etc.) which access the Web 101 have the ability to provide the server technology to host their own Web pages, suppliers 104 and 105 are separated into two groups: suppliers (104) who do not have the capability to provide Internet access to their pages and the suppliers (105) who do have the capability. As for suppliers (104) who cannot publish their own pages, the system allows suppliers 104 to upload their product information (and other information) to an ISP for page hosting purposes. Accordingly, suppliers 104 are considered low-end suppliers. The functionality of uploading pages from suppliers 104 is treated in greater detail with respect to FIG. 3. As for suppliers (105) who can publish their own pages, the system accommodates their ability as well. The functionality of uploading pages from suppliers 105 is treated in greater detail with respect to FIG. 4.

FIG. 1 further shows user 103 using information stored in portal 102. Embodiments of the present invention contemplate portal 102 not storing every piece of available information in portal 102 as the amount of storage space required may quickly become overwhelming. So, portal 102 stores some information which may answer some initial questions for user 103 and point to suppliers 104 and 105 for additional information. As user 103 consumes the information provided over Web 101, user 103 may be referred to as an integrator as it integrates the available information. Notably, the resulting data sets combined by user 103 may be placed in another portal 102 for another user's access. In this instance, user 103 becomes another supplier. For simplicity, the grouping of the entities using the disclosed system are referred to collectively as "players". The labels applied to the various players in the system (supplier, user, consumer, integrator, etc.) are intended to be relative to the surrounding players and not intended to be an absolute definition of the player.

To provide information to portal 102, suppliers 104 and 105 (and user 103, when applicable) encode their pages using a predefined protocol. Use of the protocol encourages placing available information in an organized format. The protocol may include tag codes which describe the information contained therein. For example, an HTML-based tag protocol may include the following information:

<UC domain="product" class="gimbals/shanks/widgets">
<UC_ENTRY name="standard widget" realization state="available">
<UC_FEAT name="Supplier Name" value="Acme Corporation">
<UC_FEAT name="Manufacturer Name" value="Acme Corporation">
<UC_ID name="part number" value="1234">
<UC_PAR name="Price" value="$100">
<UC_PAR name="Length" value="2.5" units="inches">
<UC_PAR name="Width" value="3.5" units="inches">

The tag <UC*>(where "*" may include additional tags) is the identifier to portal 102 that the following page is in an organizational format useable by portal 102. It is readily apparent that any predefined tag could be used as long as it is recognizable by the portal. For simplicity, organized language used by suppliers and read by portal 102 will hereinafter be referred to as "the protocol". The protocol may include various fields that describe both the information as well as the supplier of the information. In the above example, the "domain", "class", "entry name", "realization", and "PAR" (parameter) fields relate to the information supplied. The FEAT (feature) fields relate to the supplier of the information. In the above example, the Acme Corporation is both a manufacturer and supplier of a standard widget (a product) (currently available) which costs $100 per unit and has dimensions 2.5 inches by 3.5 inches. The domain field relates to the type of product. In general, the feature field may relate to alphanumeric character strings while the parameter field may relate to numerical values.

Embodiments of the present invention contemplate including a variety of different domains, each directed to at least one type of industry sector. For explanatory purposes, a variety of industry sectors are contemplated and, to these sectors, overlapping domains may exist. For example, the manufacturing industry sector may include products as well as processes. The shipping industry may include time tables for shipping routes (overlapping as to delivery schedules for the manufacturing industry). The real estate industry may include commercial and residential properties. The loan industry may include commercial and residential loans as well as the risk factors associated therewith.

The class field relates to an ordered hierarchy of information. In this example, the standard widget falls into subclass "widget", which is a subclass of subclass "shanks", which is a subclass of class "gimbals". In an alternative example, a real estate property listing may belong to a subclass "locality", which is a subclass of class "residential properties".

Figure 2:
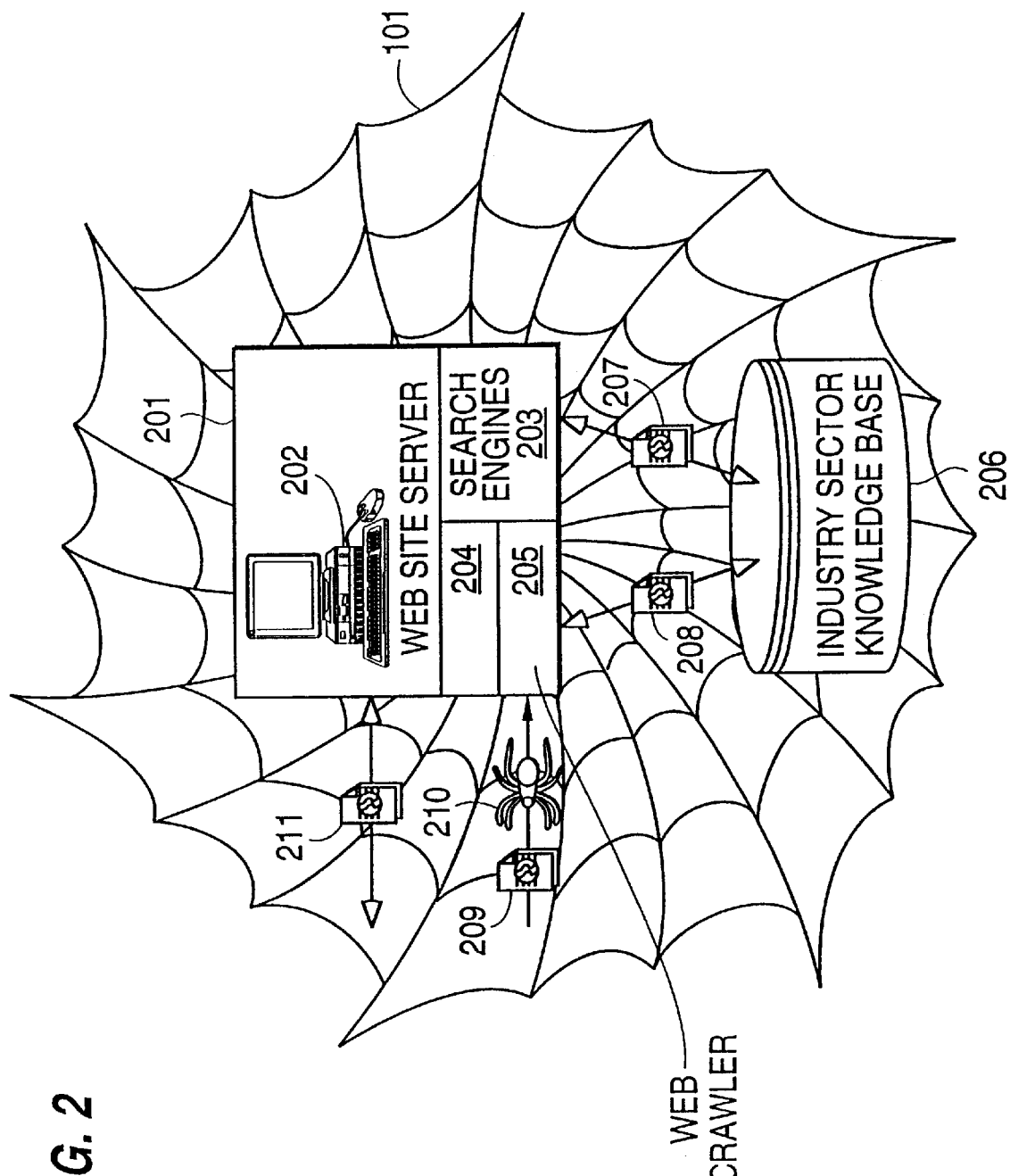
FIG. 2 shows the configuration of an industry sector portal according to embodiments of the present invention.

FIG. 2 shows a generic portal 201. Generic portal 201 is represented in the middle of Web 101 as the portals may be located in a variety of different physical and functional locations, depending on the industry and the resources available to the players involved. Portal 201 includes a Web site server 202, an online page generator 204 (also known as a protocol translator), a searching system 205 (referred to herein as a Web Crawler), search engines 203, and a knowledge base 206. Here, knowledge base 206 is represented as an industry sector knowledge base.

Embodiments of the present invention contemplate at least one industry sector knowledge base existing for each industry in a given locality. For example, in the real estate industry, a single knowledge base may support the entire industry in given locality as real estate agents would access a single knowledge base for retrieving residential and commercial listings. In other industries, each company may include its own updateable knowledge base allowing limited access to the public and greater access to employees.

Web crawler 205 periodically scans the Web for pages as represented by crawler 210. Pages 209 are retrieved and parsed in Web crawler 205. As will be described in greater detail below, the parsed pages 208 containing a usable organizational structure (for example, identified as including the <UC>tags) are stored in knowledge base 206 for indexing and future retrieval. The knowledge base 206 stores pages 208 as based on the classes found therein as well as the attributes and methods found therein (for example, the length, width, and other properties of the contained information). When a specific page needs to be retrieved for information contained therein, search engines 203 search knowledge base 206 for results meeting various search criteria. As knowledge base 206 stored previously parsed pages 208 in an ordered manner (via class, attribute, and method information) a variety of different searches may be performed on the stored information.

To search for information, embodiments of the present invention contemplate a user submitting a search request via an HTML page 211 forward to server 202. The server then forwards the requested information to search engines 203. A variety of different searches may be performed.

For example, a hierarchical search may be performed. Using a hierarchical search engine, a user may select a general class and step through the various subclasses until a specific subclass is reached. For instance, a user may be looking for brushless motors as classified in Parts/electromechanical parts/motors/brushless motors (where the general class is "Parts" and "electromechanical parts", "motors", and "brushless motors" being nested subclasses). To find a list of brushless motors, a user would first select "parts", then "electromechanical parts", then "motors", and then "brushless motors". When reaching "brushless motors", the list of available brushless motors would be displayed. Also, a full text Boolean search may be performed on the terms stored from Web Crawler 205. For example, using a search engine accessing a linear index (for example, as supplied by Alta Vista™ from Digital Equipment Corporation), a user may request information on "brushless motor". In response the search request, the search engine would scan through a stored index of terms for "brushless" and "motor" and retrieve all matching results.

Finally, a user may request a parametric search. A parametric search is a search, which attempts to match input parameters with known values in an arithmetic sense. For example, a parametric search may deal with numerical values and character strings, but generally only through a Boolean comparison. Fuzzyness allows matches to be made based on the "closeness" of one value as compared to another or one character string as compared to another. To be able to compare character strings, a fuzzy logic search relies on a predefined value map, which defines what closeness means for the attributes in question. By referencing the value map a parametric search can handle both numerical and non-numerical searches.

In a parametric fuzzy logic search, a user supplies target values for the attributes of interest (e.g., the selected parameters, features or indices), together with the relative importance of each selected attribute and other ranking information (such as "more is better" or "closer is better"). The search engine would then return the data objects that best match the target values. An example of a fuzzy logic search engine includes a search engine as developed by the Inso Corporation of Massachusetts. An example of ranking various fields is shown below:

| Subclass: | Rectifiers | | | |
|---|---|---|---|---|
| Rating: | IF AV | VRRM | IFSM | TJ |
| Desired Values: | 5 | 75 | 215 | 180 |
| Relative Importance: | very | little | very | most |
| Ranking Criteria: | more is better | more is better | less is better | exact |

Through implementing a fuzzy search specifying the above values and qualifiers, the system attempts to find the desired rectifier with the most important values satisfied first.

The web site server 202 converts the received results from search engine 203 into HTML and forwards or "serves" the created page to the requesting user through page 211.

To assist in the retrieval of information from portal 201, a user may access a variety of different tools. As described above, the user may access the search engines 203 through submitted page 211. Also, the user may employ the use of data agents as located on the user's terminal (or computer) so as to pre-format the submitted information so as to include, modify, or remove submitted information as necessary. Data agents may include CGI scripts, JAVA components, ActiveX components, and the like. In addition to data agents residing on server 202, data agents may also reside with the suppliers 104 and 105 so as to provide enhanced processing of requested information for a user.

FIG. 2 also shows protocol translator 204 as part of the portal 201. The translator 204 facilitates supplier publication of HTML pages that are compliant with the protocol and the industry common vocabulary or ontology. This is described further in the discussion of FIG. 3.

Figure 3:
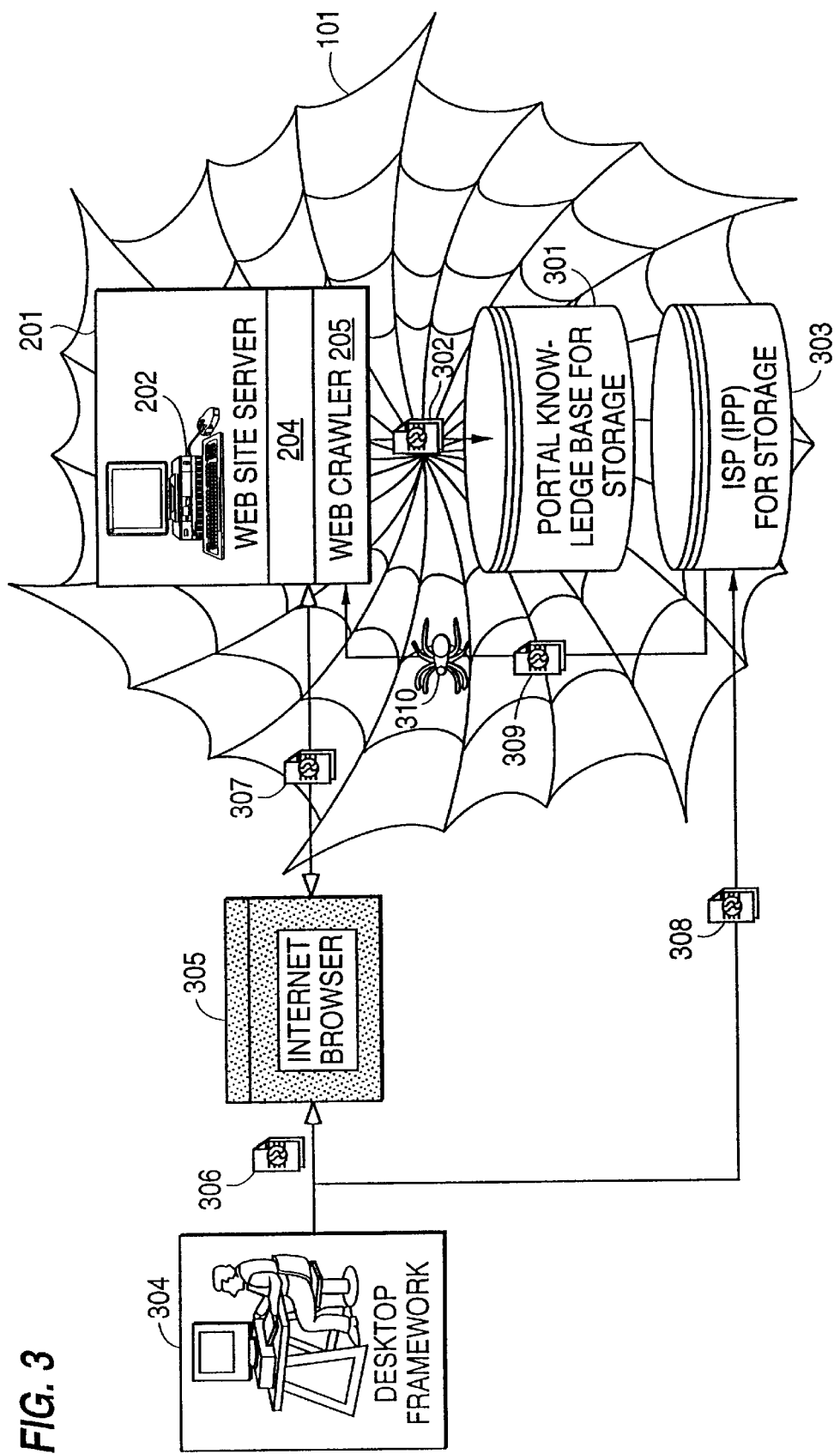
FIG. 3 shows a low end supplier with browser access according to embodiments of the present invention.

FIG. 3 shows as low end supplier 104 providing information to be scanned by a portal 201. Portal 201 is equivalent to that described with respect to FIG. 2. FIG. 3 also includes an ISP 303 (an Independent Service Provider) in Web 101. A low end supplier 304 (a supplier who lacks the capability or desire to support organized pages locally) retrieves pages 307 into an Internet browser (software running on user 304's computer which translates HTML pages and displays the pages on user 304's display).

Pages 307 include at least one template for populating and submitting back onto Web 101. Embodiments of the present invention contemplate template pages 307 including at least one of an initial set of class, attribute, and method identifiers for population. For example, user 304 requests from portal 201 the design template for electric motors. In reply, protocol translator 204 retrieves the desired class/subclass, attribute, and method ontologies. These ontologies are translated into an HTML form and sent to user 304's Internet Browser 305 as template pages 307. User 304 next populates the received template pages 307 as completed template pages 306.

Pages 306 may be forwarded back directly to portal 201 where the pages 306 are parsed and added to knowledge base 301 as page 302. Alternatively, if user 304 has an ISP 303 which will publish the populated template pages 306, then user 304 forwards the populated template pages 306 as formatted web pages 308 to ISP 303 for storage. Next, web crawler 310 scans ISP for complying pages 308 and retrieves them as pages 309 for storage in knowledge base 301 for indexing and later retrieval.

Pages 307 may be sent from a variety of different portals 201. For example, in an industry sector where only one portal exists, the template page 307 would be sent from the single portal 201. In industry sectors where multiple portals exist, each supplier and/or user may wish others to adapt a specific variety of ontology which suits their business. However, conflicting ontologies may result. To alleviate problems created by varying ontologies across a single industry sector, different portals may be programmed to respond to a specific variety of protocols. To this end, embodiments of the present invention may contemplate a single sector portal governing the recognized ontology. While each of the other portals are free to adapt their ontology as need be, retrieving template pages 307 from a sector portal almost guarantees compliance with the other portals who may have varied from the accepted ontology. Further, if a non-sector portal 201 (for example, a private corporation's portal) receives a request for a template, embodiments of the present invention contemplate providing the user 304 with a choice of sector-wide ontology or the private corporation's ontology. Moreover, variations of the type of ontology provided exist as depending on specifics of user 304 including specifics such as whether the user 304 is cleared to receive certain classified (i.e., secret) ontologies (where the classes, attributes, and/or methods themselves are classified), etc.

Once portal 201 has received new pages, a variety of methods exist for updating the other portals in the sector (provided that the industry supports other portals). First, each portal 201 may include a list of all other portals. Once new information is added, the portal 201 may transmit a message to all other portals in the industry that new information has been received by portal 201 and either attaching the new information or providing a location on portal 201 for access to the stored information. This method provides the advantages that a user may transmit information to a minimum number of portals and have the transmitted information replicated by the receiving portal. Second, the sector portal may receive and maintain a listing of all new pages. Periodically, or upon demand of a user, each portal may scan the sector portal for new page addresses then scan the new pages themselves for retrieval of the desired class, attribute, and method information.

The information which a supplier may have on his site may include image data including VRML data, CGM Active Graphics images, Java Parametric Optimizers, CAD drawings, performance specifications, executable simulations, links to the supplier's online ordering system, links to previous order status, or other image data information, etc. Also, non-image data may be found at the supplier's site including HTML pages including organized protocol, EDI links (links furthering electronic data interchange), technical data, technical services, or other non-image data information, etc. When a portal scans a supplier's site, the invention contemplates that at least some technical data (and possibly some image data) may be retrieved and stored in the portal. The remaining technical and image data may remain stored at the supplier's site for later access. The supplier may also use data agents to gather information from the users in order to, among other things, enhance the usability of the supplier's site for the user. These enhancements may include personalizing the supplier's site through placing data agents on the supplier's site including possibly CGI scripts, Java applets, and interfaces to the supplier's databases. For example, a supplier's site may include a Java applet which may enable enhanced searching of a supplier's site for green widgets. By providing the Java applet to a scanning portal, the portal may incorporate the Java applet into its stored index of suppliers so that, when information is requested from the supplier's site, the user may run the Java component to enhance the retrieval of information (for example, through the user dynamically accessing and manipulating a supplier's information as stored in the portal). Also, the Java component may format information when transmitted from the user to the supplier so, when received at the supplier's server, the supplier may quickly process received questions as having been previously formatted by the Java applet.

Figure 4:
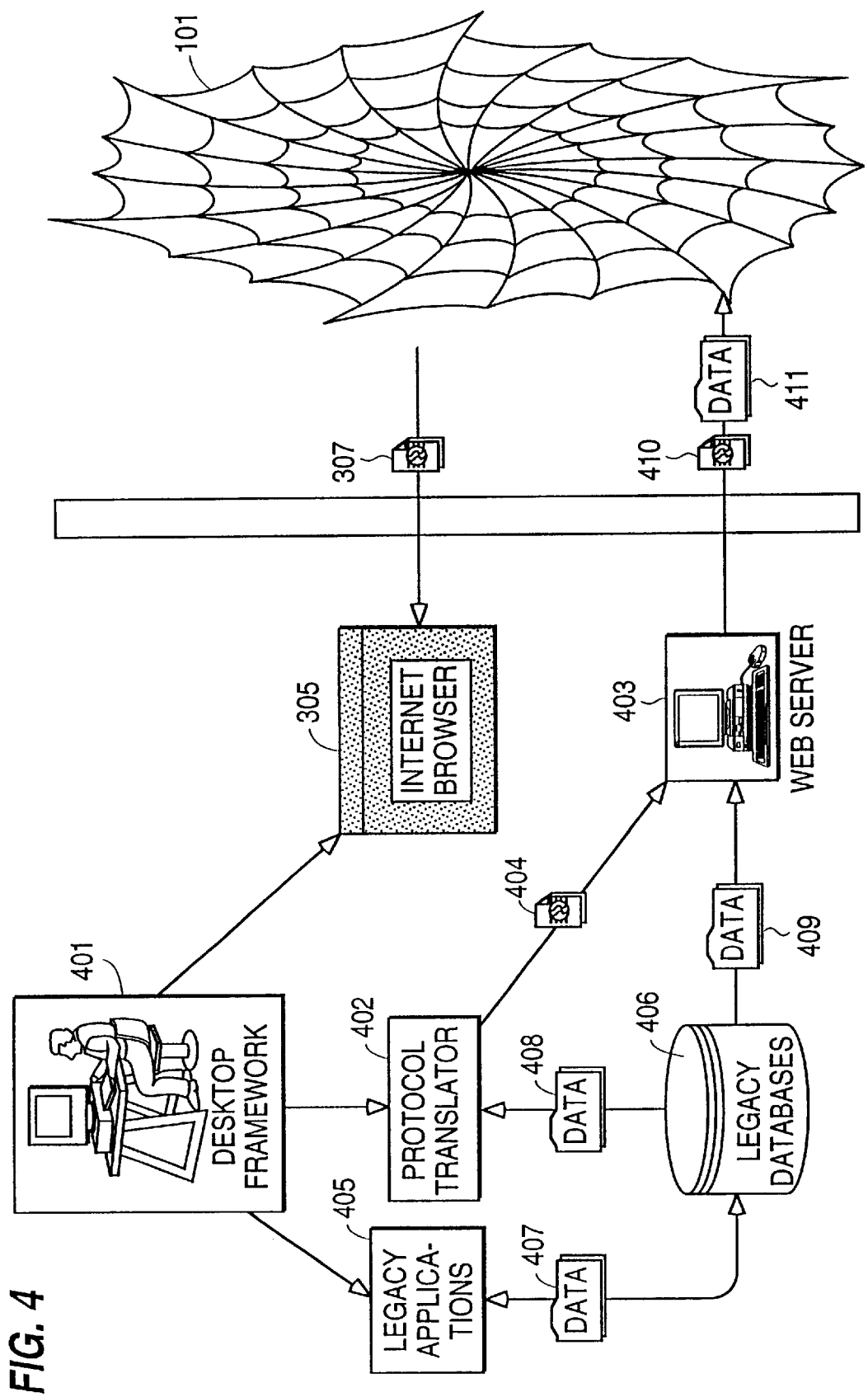
FIG. 4 shows a high end supplier with a page generator according to embodiments of the present invention.

FIG. 4 shows a supplier 105 which has the capability to publish its own protocol-compliant pages. The supplier 105's site includes a desktop framework 401, an Internet browser 305, protocol translator 402, web server 403, legacy applications 405, and legacy databases 406. An operator at desktop framework 401 requests a template page 307. The template page may be transferred to the protocol translator where the template page is combined with data (class, method, attribute, etc.) specifying the supplied products and processes from supplier 105. The resulting page 404 may be transferred to web server 403 for posting. On request, the compiled pages 404 may be transferred to other sites (for example, users' portals 102) as pages 410. Alternately, the protocol translator may map data stored in legacy databases 406 to fields in the template, create an HTML page 404 embodying that data and the special protocol tags, and transfer that page 404 to web server 403 for posting. The translator may also save the mapping for repeated use.

Legacy databases 406 may store additional data (for example, images, VRML representations, specifications, or other data, etc.) which describe in greater detail supplier 105's products and/or processes. Supplier 105 may make this additional information available to other portals as required (for portals meeting various requirements, possibly including security or other requirements). For example, when further information not found or in addition to information found on pages 410, the web server receiving the request may forward the request to legacy database 406 from where the requested information is accessed. The legacy database 406 may forward the data 409 to web server 403 which then may forward the requested data, properly formatted in HIML as data 411. Additionally, the data 411 may be transmitted in a form compatible with the applet at the requesting portal 102 for proper display in conjunction with the requesting applet.

Other applications 405 may provide support for other functions of supplier 105's site including updating of the information stored in legacy database 406 as well as for allowing supplier 105's site to support a suite of integration tools as may be necessary for applications contained in tool suite 602 (described in greater detail below with respect to FIG. 6).

Figure 5:
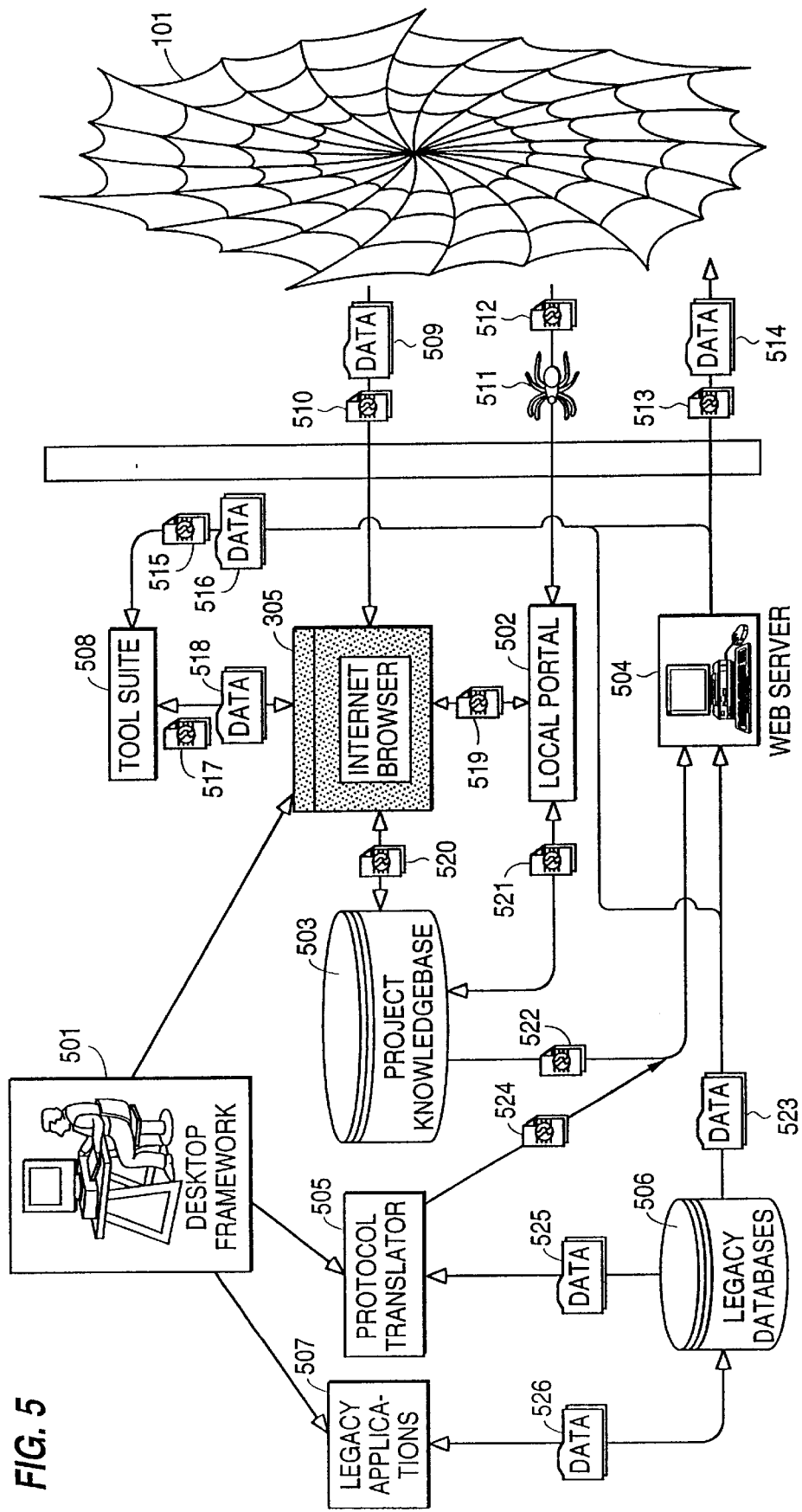
FIG. 5 shows a consumer according to embodiments of the present invention.

FIG. 5 shows user site 103 as including a desktop framework 501, an Internet browser 305, a local portal 502, a web server 504, project knowledge base 503, protocol translator 505, legacy applications 507, legacy databases 506 and tool suite 508. Internet browser 305 may function similarly to the browser of FIGS. 3 and 4 yet may retrieve data 509 in addition to pages 510. Browser 305 may transmit the received pages to tool suite 508, project knowledge base 503 and local portal 502. Also, browser 305 may exchange the received data 509 as needed with tool suite 508.

The desktop framework 501 may access a variety of integration tools, data agents, PDM's, the local portal 502, an application programming interface, and an internal cache of accessed pages.

Local portal 502 may retrieve pages 512 through crawler 511 which may scan the Internet 101. The retrieved page may then be parsed to page 521 and transferred to project knowledge base 503. When accessed, project knowledge base 503 provides requested information as page 520 to Internet browser 305 (when, for example, an operator requests information stored in project knowledge base 503) or as page 522 to web server 504 (when, for example, page 522 containing a finished product or process is to be published onto the Internet 101, for other upstream portals 102). When web server 504 serves to publish compiled pages, it may act like server 403 in FIG. 4. To this end, legacy applications 507, protocol translator 505, legacy database 506 may function similarly to that of the corresponding elements in FIG. 4.

Tool suite 508 may also receive additional pages 515 from web server 504 or pages 517 from browser 305. Data 516 and data 518 may follow similar supply paths respectively. Tool suite 508 includes a variety of tools which integrate the information contained in other portals 102, the local portal 502, and web server 504 (as retrieving information, at least in part, from legacy database 506).

Figure 6:
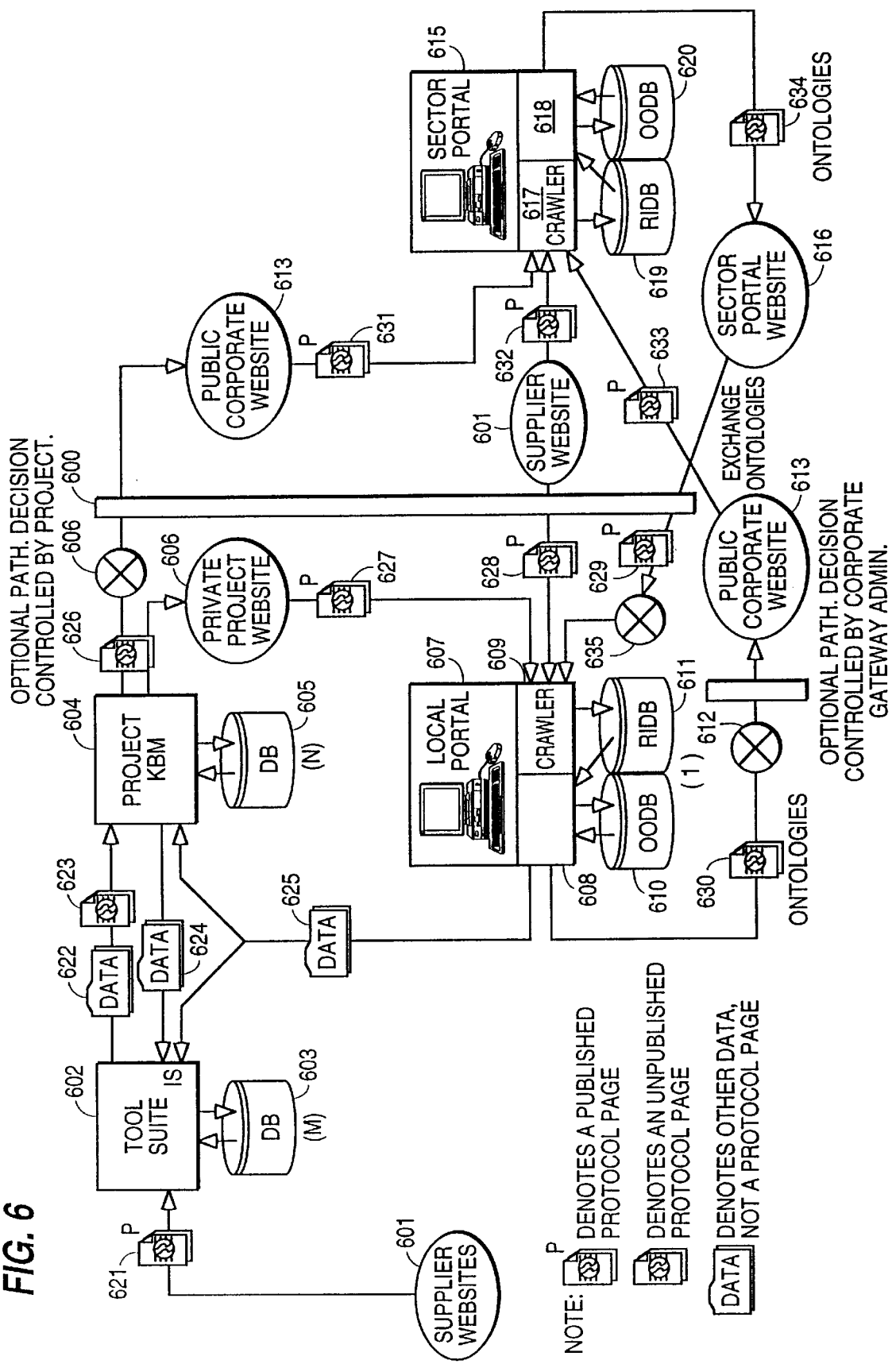
FIG. 6 shows an architectural representation of sector and local portals, according to embodiments of the present invention.

FIG. 6 shows a more detailed illustration of the system of FIG. 5. Delineation 600 indicates the boundary between a corporate portal and associated systems and entities on the Internet. Local portal 607 includes at least two distinct systems: a crawler 609 (similar to crawler 205 described above in FIG. 2), and ontology tracking component 608. Connected to the crawler 609 and ontology tracking component 608 are a reverse index data base (RIDB) 611 and an object oriented database (OODB) 610. Crawler 609 may receive pages from a number of sources including a supplier's web site 601, a sector portal web site 616 (publishing pages and/or ontologies 634), or a private project web site 606. Crawler 609 parses the received pages into character strings and stores the strings in RIDB 611 where RIDB 611 indicates from where the strings were received. When RIDB 611 has received a predetermined amount of protocol data, the protocol data is sent to ontology tracking component 608 where the ontology tracking component may store the found protocol data in OODB 610. In storing the found protocol data in OODB 610, ontology tracking component 608 may control the OODB 610 to store the received protocol data in an organized structure. For example, the ontology tracking component 608 may control the OODB 610 to store the received protocol data as grouped by class, attribute, and/or methods. Also, the OODB 610 may store the signatures as separate from the methods to allow indexing. When requested, ontology tracking component 608 may search and retrieve information from OODB 610 to satisfy search requests as outlined above.

One feature of the ontology tracking component 608 is that it may maintain the ontology for organizing OODB 610. When new classes, attributes, and/or methods are received by crawler 609, the new information is provided to ontology tracking component 608 for processing. Ontology tracking component 608 may process the new class/method/attribute in a variety of ways. For example, ontology tracking component 608 may not update its own ontology, instead waiting for standardized ontology 634 from sector portal 615. In this regard, a single ontology is maintained with sector portal 615. When all portals subscribe to only allowing sector portal 615 to update the accepted ontology, an invariant ontology is maintained. Alternately, ontology tracking component 608 may always update its own ontology, allowing maximum flexibility and creativity to the authors of published pages. Further, ontology tracking component 608 may selectively update the ontology based on a predetermined pattern of usage or time associated with newly received classes/methods/attributes. For example, ontology tracking component 608 may wait until a new class has been used in at least 10 pages before it dynamically updates itself to allow others to use the new class as well as index on the class. Also, ontology tracking component 608 may wait until a new class has been used for 3 months before updating its own ontology. By limiting the rate at which the ontology tracking component 608 updates itself, the ontology tracking component 608 may minimize spurious occurrences of new terms (which, in some instances, may be due to typographical or transmission errors). Once updated, ontology tracking component may provide the new ontology to sector portal 615 through public corporate web site 613 via page 633.

In addition to the ontology describe above, the ontology tracking component 608 may also include the following baseline for associated objects:

| | |
|---|---|
| Ensemble | A product which includes this product; |
| Ancestor | Previous version of this product; |
| Descendent | Updated version of this product; |
| Component | A component used in this product; |
| Accessories | Other products which go the with the product; and, |
| Alternatives | Other Products which might also meet requirements. |

Baseline ontology methods may include business functions, price or cost analysis, calculation of lead time required for product delivery, calculation of need for customization, a function for ordering parts, and a function for ordering services.

Additional methods may be performed by portal 607 including page certification, a crawler report of visited pages, and a page validation so as to ensure errors are kept to a minimum.

Integration with other system components such as the tool suite or project knowledge base may be made through CORBA or JAVA as needed.

The information as stored in OODB 610 may be considered atomic or elemental in nature as that it is combined with other information stored in the OODB (other atoms or elements, collectively "items") and provided to a user. The user requests the items from portal 607 and receives data 625. Project knowledge base manager 604 receives data 625 and stores the data in database 605. Here, the received data 625 may be cataloged according to current projects a user is working. Also, the database 605 may also contain catalogs of items. For example, a user may want to build a device that requires a first component and a second component. The user searches via a search query (Boolean, hierarchical, parametric, etc.) and receives items A and B which match the search criteria for the first component and receives items C and D which match the search criteria for the second component. The project knowledge base manager may store the information relating to items A and B together in a first catalog in database 605 and items C and D together in a second catalog in database 605. Accordingly, when the user needs to evaluate or try a different item (part, process, etc.), the user may directly access the stored list of catalogs. Also the current project may be stored in database 605 as a work in progress. The difference between the information stored in a catalog and the information stored as a work in progress is that the catalogs store end items, while information stored as a work in progress is a combination of elements or end items. At least one goal of the catalog is to provide a readily accessible database of information for use in the creation of end items; while at least one goal of the project database is to store the created end items (products or processes) as they evolve.

Once a user completes an end item, project knowledge base manager 604 may direct information relating to the completed end item (completed page 626) to private project web site 606 (which may contain additional end items (products, processes, etc.)) for internal distribution to local portal 607. As local portal 607 may be one of a plurality of local portals 607 for a corporation, the information provided on private project web site 606 may be transmitted to these additional web sites as well. One embodiment of the present invention contemplates local portal 607 scanning private project web site 606 periodically or upon request from a user. Periodic scanning keeps local portal 607 updated autonomously. On the other hand, scanning upon request minimizes bandwidth consumption for exchanging information. To this end, a user may specify when the portal is to scan (the web in general or specific sites) for new protocol-compliant pages.

An example of a process implemented in portal 607 is as follows:

1) the portal 607 scans for information (628, 629) from external information providers (601, 616) and for information (627) from internal information providers (606).
2) the portal stores the received information;
3) the portal dynamically creates web pages for a user based on the stored information; and,
4) provides links to the additional information left back on the supplier's page.

Tool suite 602 includes various tools which may use information 624 provided by project KBM 604, information 625 from the ontology tracking component 608 and related databases 610 and 611, and from supplier web sites 601. These tools may include a requirements integration and verification tool (which assures that assembled design objects (end items) meet individual requirements and comply with predefined rules); an affordability monitor (which determines if the cost of the included items and the processes required for combination exceeds predetermined budgets), a trade-off manager (which trades various elements to arrive at varying end items so to assist in the decision making process), a realization generator (which creates process alternatives for combining elements for determining whether the end item may be improved through alternative processes), and an integrated supply chain scheduler (which coordinates the communication and information exchange among entities in a supply chain so as to arrive at feasible manufacturing schedules). These tools may autonomously access the information stored in the portal 607 or stored in supplier web sites 601 to compile and assist users in defining end items.

Using the above described invention, users may rapidly configure a supply chain of information, easily search the chain for relevant information, determine the best match of existing end items to new requirements, integrate desired goals or preferences into a created end item, aggregate product realization plans for assembling a product, estimate the feasibility and effect of information trade-offs as pertaining to, for example, costs, facilitate the exchange of models, simulations, and statistical information, integrate and manage trades, and exchange information with other applications.

Applications of the above described invention may include manufactured goods as relating to, at least, industry sectors including aerospace, automotive, general and discrete manufacturing, electronics, pharmaceuticals, and other industry specific manufacturing supply and design chains and to service industries including, at least, real estate markets, financial institutions' information exchange, loan institutions' information exchange, insurance institutions' information exchange, and other industry specific information exchanges.

While the present invention has been particularly described with reference to the preferred embodiments, it should be readily apparent to those of ordinary skill in the art that changes and modifications in form and details may be made without departing from the spirit and scope of the invention. For example, the processes described above may be implemented in software. For instance, the portals' 102 ability to retrieve, organize and store may be coordinated from stored memory modules as executed by said portal. It is intended that the appended claims include such changes and modifications.

We claim:

1. A system for retrieving information from a supplier comprising:

a portal receiving information from a supplier, said information arranged in a predefined protocol, said portal having a storage, said storage storing said information in catalogs, wherein said portal receives requests from a user for said information and outputs said information as stored in said catalogs.

2. The system according to claim 1, wherein said portal is connected to said supplier through the Internet.

3. The system according to claim 1, wherein said portal receives additional information from said user and stores said additional information in said storage, and wherein said additional information being items created from said information from said catalogs.

4. The system according to claim 3, wherein said portal receives a second request from another user for said additional information.

5. The system according to claim 1, said portal further comprising:

a search engine retrieving said information from said supplier.

6. The system according to claim 5, wherein said search engine periodically scans said supplier for said information.

7. The system according to claim 5, wherein said search engine scans said supplier for said information based on prompting by said user.

8. The system according to claim 5, said storage further comprising:

an ontology tracking component connected to said search engine;

a reverse index database; and an object oriented database.

9. The system according to claim 1, wherein the protocol of said information includes organizational terms.

10. The system according to claim 1, wherein said user queries said portal through at least one of a Boolean query, a hierarchical query, or a parametric query.

11. A method of acquiring information from a supplier comprising the steps of:
 receiving at a portal information from said supplier, said supplier storing said information in a protocol;
 storing at said portal said information in a catalog in a storage according to said protocol.

12. The method according to claim 11, further comprising the steps of:
 parsing said information based on said protocol and
 storing parsed information from said parsing step in an object oriented database.

13. The method according to claim 11, further comprising the steps of:
 receiving at said portal additional information from a player, said additional information comprising information previously stored at said portal.

14. The method according to claim 11, further comprising the steps of:
 searching said supplier for data satisfying said protocol and retrieving said data as said information.

15. The method according to claim 11, wherein said protocol comprises an ontology,
 said method further comprising the steps of:
 monitoring said information from said supplier for changes in said protocol from said ontology;
 modifying said ontology to include the changes in said protocol as used by said supplier.

16. The method according to claim 15, further comprising the step of:
 retrieving said ontology from a sector portal storing an approved ontology for an industry sector.

17. The method according to claim 15, wherein said ontology includes class definitions with attributes and methods.

18. The method according to claim 11, wherein said protocol includes organizational terms.

19. A system for retrieving information from a supplier, said supplier providing information arranged in a predefined protocol to a portal, said portal having a storage that stores said information in catalogs, said system comprising:
 a desktop framework that receives a request from a user,
 wherein said desktop framework retrieves information from said portal as stored in said catalogs.

20. A method of acquiring information from a supplier said supplier providing information arranged in a predefined protocol to a portal, said portal having a storage that stores said information in catalogs, comprising the steps of:
 receiving a request from a user,
 retrieving information from said portal as stored in said catalogs.

* * * * *